United States Patent
Upperman et al.

(10) Patent No.: US 10,690,013 B2
(45) Date of Patent: *Jun. 23, 2020

(54) SYSTEM AND METHOD FOR LIQUID AIR ENERGY STORAGE

(71) Applicants: John D. Upperman, Zion Grove, PA (US); Ralph Greenberg, Santa Rosa, CA (US)

(72) Inventors: John D. Upperman, Zion Grove, PA (US); Ralph Greenberg, Santa Rosa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/691,893

(22) Filed: Nov. 22, 2019

(65) Prior Publication Data

US 2020/0102858 A1    Apr. 2, 2020

Related U.S. Application Data

(63) Continuation-in-part of application No. 16/014,820, filed on Jun. 21, 2018, now Pat. No. 10,508,596.

(60) Provisional application No. 62/604,032, filed on Jun. 21, 2017.

(51) Int. Cl.
| | |
|---|---|
| *F01K 25/10* | (2006.01) |
| *F17C 9/00* | (2006.01) |
| *F28D 20/02* | (2006.01) |
| *F02C 6/14* | (2006.01) |
| *F01K 23/02* | (2006.01) |
| *F03D 9/17* | (2016.01) |

(52) U.S. Cl.
CPC .............. *F01K 25/10* (2013.01); *F01K 23/02* (2013.01); *F02C 6/14* (2013.01); *F03D 9/17* (2016.05); *F17C 9/00* (2013.01); *F28D 20/021* (2013.01)

(58) Field of Classification Search
CPC . F01K 25/10; F01K 23/02; F02C 6/14; F03D 9/17; F17C 9/00; F28D 20/021
USPC .................................. 60/650, 655, 682–684
See application file for complete search history.

(56) References Cited

U.S. PATENT DOCUMENTS

| | | | | |
|---|---|---|---|---|
| 10,508,596 B2* | 12/2019 | Upperman | ................ | F03D 9/17 |
| 2009/0113928 A1* | 5/2009 | Vandor | .................. | F25J 1/0022 |
| | | | | 62/612 |

* cited by examiner

*Primary Examiner* — Hoang M Nguyen
(74) *Attorney, Agent, or Firm* — Michael A. Blake

(57) ABSTRACT

A liquid energy storage system where the mixed refrigerant may include the following components with concentrations in mole volume percentages as follows: about 12.0% Nitrogen, about 15.0% Ethylene, about 39.0% Methane, about 20.0% Ethane, about 10.0% Propane, and about 4.0% Iso-Butane. A liquid energy storage system where the thermodynamic relationship for lost work is characterized by:

$$W_{lost} = T_O \text{Integral}(T_1 - T_2)/(T_1 \times T_2) dH,$$

where $T_o$ is the ambient temperature and $T_1$, and $T_2$ are the temperatures of the hot and cold streams, respectively, all temperatures are absolute temperatures, and H represents the enthalpy or heat content of the fluids in the heat exchange process.

12 Claims, 4 Drawing Sheets

LAES PROCESS

POWER OUTPUT - MW

| EQUIPMENT NO. | ENERGY DESIGNATION | PROCESS CIRCA 2012 | PROCESS PER FIGURE 1 | PROCESS PER FIGURE 2-3 |
|---|---|---|---|---|
| PUMP-204 | Q-1 | (1.96) | -1.73 | -1.73 |
| TRBN-216 | Q-3 | 17.31 | 15.86 | 15.86 |
| TRBN-224 | Q-5 | 17.23 | 15.99 | 15.99 |
| TRBN-228 | Q-6 | | 14.36 | 21.09 |
| TRBN-236 | Q-7 | | 11.66 | 18.81 |
| PUMP-101 | Q-10 | | -0.91 | -1.41 |
| NET OUTPUT TOTAL, MW | | 32.58 | 56.14 | 70.02 |

FIG. 4

SYSTEM AND METHOD FOR LIQUID AIR ENERGY STORAGE

CROSS-REFERENCES

This patent application is a continuation-in-part of U.S. patent application Ser. No. 16/014,820 John D. Upperman and Ralph Greenberg entitled "SYSTEM AND METHOD FOR LIQUID AIR STORAGE ENERGY STORAGE," filed on Jun. 21, 2018, and which application is fully incorporated by reference herein. U.S. patent application Ser. No. 16/014,820 claims the benefit of U.S. Provisional Patent Application No. 62/604,032 by inventors John D. Upperman and Ralph Greenberg entitled "PROCESS FOR RENEWABLE ELECTRICITY STORAGE AT WIND FARMS AND POWER PLANTS," filed on Jun. 21, 2017, and which provisional application is fully incorporated by reference herein.

TECHNICAL FIELD

The present invention relates to liquid air energy storage systems ("LAES systems"). The invention also relates to methods for energy storage and electric energy production using LAES systems.

BACKGROUND

Actual storage of electricity has long been limited to batteries and other systems with limited capacity such as flywheels, but virtual electricity storage is now possible by utilizing pumped water storage, ice storage and compressed air storage (CAES). Wind farms are faced with the problem of matching power availability with demand on a real time basis. Issues faced by wind farms include: o Wind availability may be low or absent during peak demand periods. o Wind energy may be abundant at night during periods of low electric power demand. There is no proven way to store electricity from wind farms. o Wind farms cannot offer significant energy quantities on a firm basis. Utility operated power plants sit idle for most of the nighttime resulting in underutilization of its equipment. Prior Art The most promising method for virtual electricity storage at combined cycle power plants involves the linking of a gas turbine combined cycle generation system (gas turbine+steam turbine) with compressed air stored at high pressure (CAES) in underground caverns or spent wells. Compressed air is produced and stored at night utilizing low cost nighttime power. During high demand periods (daytime) the stored compressed air is delivered to the gas turbine. These systems have been installed at several locations in the United States. Daytime power plant operation is based on withdrawal of stored compressed air for utilization as combustion air in the gas turbine. This enables the air compressor section of the gas turbine to "free wheel" while consuming little or no power. The full output of the gas turbine (more than twice the rated output) is then available as electricity during peak demand hours. Power plant revenues are increased significantly because more power is sold at higher prices while little or no power is wasted at night. A larger generator is required, but operating costs are nearly unaffected The problem facing CAES systems is that the power plant must be located adjacent to empty caverns such as salt domes or spent oil/gas wells. It is very uncommon to site power plants adjacent to empty caverns or spent oil/gas wells.

A planned and started transfer to the decarbonized power grids is based first of all on increased use of renewable (mainly wind and solar) energy sources. However with large shares of these technologies, it may be desirable to take steps to ensure the on-demand and reliable supply of electricity, taking into account a variable output of the renewable energy sources and a frequent both positive and negative unbalance between this output and a current demand for power. One of the possible ways for solving this problem is the use of large-scale energy storages in the decarbonized power grids.

Amongst the energy storage technologies able to accumulate a lot of energy and store it over a long time-period, a recently proposed Liquid Air Energy Storage (LAES) technology is distinguished by the freedom from any geographical, land, and/or environmental constraints inherent in other large-scale energy storage technologies such as Pumped Hydroelectrical Storage and Compressed Air Energy Storage. In addition, LAES technology is characterized by much simpler permitting process and a possibility for co-location with any available sources of natural or artificial, cold or/and hot thermal energy, which may be used for enhancement of its power output.

Known LAES systems have inefficiencies, and often do not use the cold fluids in the most efficient manners.

Thus there is a need for a process for compressed air energy storage that overcomes the above listed and other disadvantages.

SUMMARY OF THE INVENTION

The disclosed invention relates to a liquid air energy storage system, the system comprising: a liquid air storage means; an input of a first pump in fluid communication with the liquid air storage means; a first heat exchanger in fluid communication with an output of the first pump; a second heat exchanger in fluid communication first heat exchanger and configured to receive the fluid stream from the first pump and the first heat exchanger; a first expander turbine generator in fluid communication with the second heat exchanger; the first heat exchanger in fluid communication with the first expander turbine generator; a third heat exchanger in fluid communication with the first heat exchanger and configured to receive the fluid stream from the first expander turbine generator and the first heat exchanger; a second expander turbine generator in fluid communication with the third heat exchanger; the first heat exchanger in fluid communication with the second expander turbine generator; the fluid stream from second expander turbine generator and first heat exchanger in fluid communication with ambient atmosphere; a mixed refrigerant stream in fluid communication with a third expander turbine generator; a fourth heat exchanger in fluid communication with the third expander turbine generator; a fourth expander turbine generator in fluid communication with the fourth heat exchanger; a fifth heat exchanger in fluid communication with the fourth expander turbine generator; the first heat exchanger in fluid communication with the fifth heat exchanger; an input of a second pump in fluid communication with the first heat exchanger, and configured to receive the mixed refrigerant stream from the fifth heat exchanger and the and the first heat exchanger; the first heat exchanger in fluid communication with the output of the second pump; a sixth heat exchanger in fluid communication with the first heat exchanger, and configured to receive the mixed refrigerant stream from the output of the second pump and the first heat exchanger; and the third expander turbine generator in fluid communication with the sixth heat exchanger.

In addition, the disclosed invention relates to a liquid air energy storage system, the system comprising: a liquid air storage means; an input of a first pump in fluid communication with the liquid air storage means; a first heat exchanger in fluid communication with an output of the first pump; a second heat exchanger in fluid communication first heat exchanger and configured to receive the fluid stream from the first pump and the first heat exchanger; a first expander turbine generator in fluid communication with the second heat exchanger; the first heat exchanger in fluid communication with the first expander turbine generator; a third heat exchanger in fluid communication with the first heat exchanger and configured to receive the fluid stream from the first expander turbine generator and the first heat exchanger; a second expander turbine generator in fluid communication with the third heat exchanger; the first heat exchanger in fluid communication with the second expander turbine generator; the fluid stream from second expander turbine generator and first heat exchanger in fluid communication with ambient atmosphere; a mixed refrigerant stream in fluid communication with a third expander turbine generator; a fourth heat exchanger in fluid communication with the third expander turbine generator; a fourth expander turbine generator in fluid communication with the fourth heat exchanger; a fifth heat exchanger in fluid communication with the fourth expander turbine generator; the first heat exchanger in fluid communication with the fifth heat exchanger; a seventh heat exchanger in fluid communication with the first heat exchanger, and configured to receive the mixed refrigerant stream from the fifth heat exchanger and the and the first heat exchanger; an input of a second pump in fluid communication with the seventh heat exchanger; the first heat exchanger in fluid communication with the output of the second pump; a phase separator in fluid communication with the first heat exchanger, and configured to receive the mixed refrigerant stream from the output of the second pump and the first heat exchanger; a liquid mixed refrigerant stream exiting the phase separator and in fluid communication with the first heat exchanger; the liquid mixed refrigerant vaporizing due to the first heat exchanger and becoming a second vapor mixed refrigerant stream; a sixth heat exchanger in fluid communication second vapor mixed refrigerant stream; the third expander turbine generator in fluid communication with the sixth heat exchanger; and a first vapor mixed refrigerant stream exiting the phase separator and in fluid communication with the sixth heat exchanger.

The disclosed invention also relates to a method for liquid air energy storage, the method comprising: pumping a liquid air stream in a first pump; exchanging heat with the liquid air stream in a first heat exchanger so the liquid air becomes vapor air stream; removing energy from the vapor air stream in a second heat exchanger; driving a first expander turbine generator with the vapor air stream and generating a first amount of electricity; cooling the vapor air stream from the first expander turbine generator in the first heat exchanger; removing energy from the vapor air stream from the first heat exchanger and from the first expander turbine generator in a third heat exchanger; driving a second expander turbine generator with the vapor air stream and generating a second amount of electricity; exchanging heat with the vapor air stream from the second expander turbine generator in the first heat exchanger and then releasing the vapor air stream to the ambient atmosphere; driving a third expander turbine generator with a mixed refrigerant vapor stream and generating a third amount of electricity; removing energy from the mixed refrigerant vapor stream in a fourth heat exchanger; driving a fourth expander turbine generator with the mixed refrigerant vapor stream from the fourth heat exchanger and generating a fourth amount of electricity; removing energy from the mixed refrigerant vapor stream in a fifth heat exchanger; exchanging energy with the mixed refrigerant vapor stream in the first heat exchanger; pumping the mixed refrigerant vapor stream in a second pump; exchanging energy with the mixed refrigerant vapor stream from the second pump in the first heat exchanger; and exchanging energy with the mixed refrigerant vapor stream from the first heat exchanger and second pump in a sixth heat exchanger.

Additionally, the disclosed invention relates to a liquid air energy storage system, the system comprising: pumping a liquid air stream in a first pump; exchanging heat with the liquid air stream in a first heat exchanger so the liquid air becomes vapor air stream; removing energy from the vapor air stream in a second heat exchanger; driving a first expander turbine generator with the vapor air stream and generating a first amount of electricity; cooling the vapor air stream from the first expander turbine generator in the first heat exchanger; removing energy from the vapor air stream from the first heat exchanger and from the first expander turbine generator in a third heat exchanger; driving a second expander turbine generator with the vapor air stream and generating a second amount of electricity; exchanging heat with the vapor air stream from the second expander turbine generator in the first heat exchanger and then releasing the vapor air stream to the ambient atmosphere; driving a third expander turbine generator with a mixed refrigerant vapor stream and generating a third amount of electricity; removing energy from the mixed refrigerant vapor stream in a fourth heat exchanger; driving a fourth expander turbine generator with the mixed refrigerant vapor stream from the fourth heat exchanger and generating a fourth amount of electricity; removing energy from the mixed refrigerant vapor stream in a fifth heat exchanger; exchanging energy with the mixed refrigerant vapor stream in the first heat exchanger; exchanging energy with the mixed refrigerant vapor stream in a seventh heat exchanger; pumping the mixed refrigerant vapor stream in a second pump; exchanging energy with the mixed refrigerant vapor stream from the second pump in the first heat exchanger and creating a mixed refrigerant liquid vapor stream; separating a mixed refrigerant vapor stream and mixed refrigerant liquid stream from the mixed refrigerant liquid vapor stream in a phase separator; exchanging energy with the mixed refrigerant liquid stream from the phase separator in the first heat exchanger, changing the mixed refrigerant liquid stream to a mixed refrigerant vapor stream; exchanging energy with the mixed refrigerant vapor stream from the first heat exchanger and phase separator in a sixth heat exchanger; and exchanging energy with the mixed refrigerant vapor stream directly from the phase separator in the sixth heat exchanger.

BRIEF DESCRIPTION OF THE DRAWINGS

The present disclosure will be better understood by those skilled in the pertinent art by referencing the accompanying drawings, where like elements are numbered alike in the several figures, in which:

FIG. 4 is a table.

DETAILED DESCRIPTION OF THE INVENTION

Figure 1:
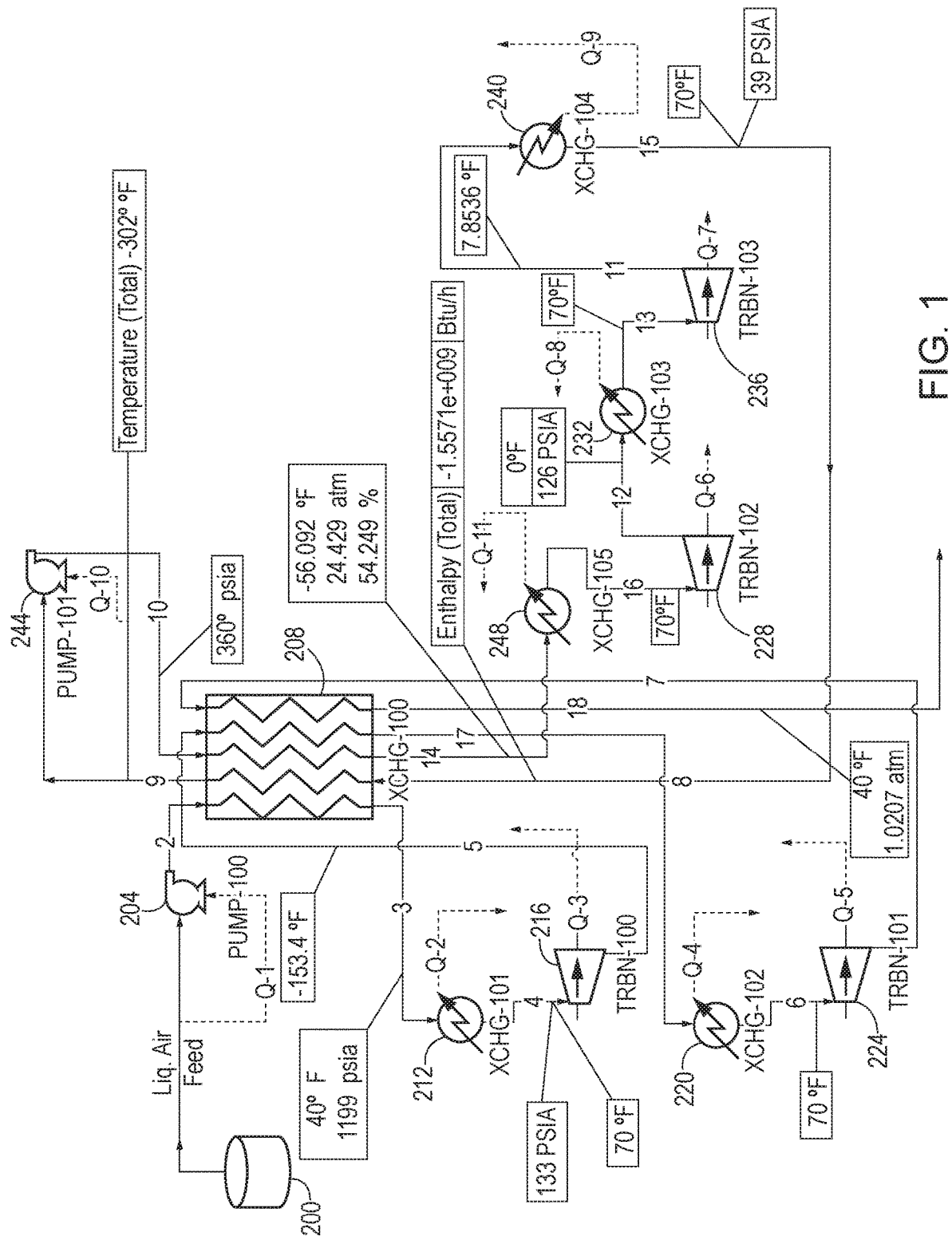
FIG. 1 is a schematic diagram illustrating one embodiment of the disclosed process for LAES.

FIG. 1 is a schematic diagram illustrating one embodiment of the disclosed process for LAES. A liquid air storage means 200 is in fluid communication with a pump 204. The pump requires energy designated as Q-1. The fluid stream between the storage means 200 and pump 204 may be at about 345.6 MMSCFD (Million Standard Cubic Feet per Day) or about 2.4e+0005 SCFM (Standard Cubic Feet per Minute). The pump 204 is in fluid communication with the heat exchanger 208. The fluid stream leaves the pump 204 at about 1200 psia and −308° F. The fluid stream from the pump 204 leaves the heat exchanger 208 and enters another heat exchanger 212 at about 40° F., 1199 psia. The fluid stream leaves the heat exchanger 212 at about 133 psia and 70° F., and enters an expander turbine generator 216. Electricity may be produced from the expander turbine generator 216, and the electricity may be designated as Q-3. The fluid stream leaves the expander turbine generator 216 and enters the heat exchanger 208. The fluid stream from the expander turbine generator 216 exits the heat exchanger 208 and enters heat exchanger 220. The fluid stream leaves the heat exchanger 220 and enters expander turbine generator 224 at about 70° F. Electricity may be produced from the expander turbine generator 224, and the electricity may be designated as Q-5. The fluid stream leaves the expander turbine generator 224 and enters the heat exchanger 208. The fluid stream from the expander turbine generator 224 leaves the heat exchanger 208 and may be vented to atmosphere.

The disclosed LAES process uses a refrigerant. In one embodiment, the refrigerant may have a standard vapor volumetric flow (total) of about 600 MMSCFD. In one embodiment, the refrigerant may comprise the following: methane (mole faction, total) about 38%; ethylene (mole faction, total) about 15%; propane (mole faction, total) about 10%; nitrogen (mole faction, total) about 12%; ethane (mole faction, total) about 20%; and i-butane (mole faction, total) about 4%. The refrigerant enters an expander turbine generator 228 at about 70° F. The expander turbine generator 228 generates electricity designated as Q-6. The fluid stream leaves the expander turbine generator 228 at about 0° F. and at about 126 psia and enters a heat exchanger 232. The fluid stream leaves the heat exchanger 232 at about 70° F., and enters a expander turbine generator 236. The expander turbine generator 236 generates electricity designated as Q-7. The fluid stream leaves the expander turbine generator 236 at about 7.8° F. and enters a heat exchanger 240. The fluid stream leaves the heat exchanger 240 at about 70° F. and 39 psia and enters the heat exchanger 208. The fluid stream leaves the heat exchanger 208 at about −302° F. and enters a pump 244. The pump 244 requires energy designated at Q-10. The fluid stream leaves the pump 244 and enters the heat exchanger 208 and exits the heat exchanger 208 and enters the heat exchanger 248. The fluid stream leaves the heat exchanger 248 and enters the expander turbine generator 228 at about 70° F. In the embodiment shown in FIG. 1, the values for the electricity generated or used may be as follows: Q-1, −1.7326 MW; Q-3, 15.863 MW; Q-5, 15.986 MW; Q-6, 14.358 MW; Q-7, 11.655 MW, Q-10, −0.090794 MW.

Figure 2:
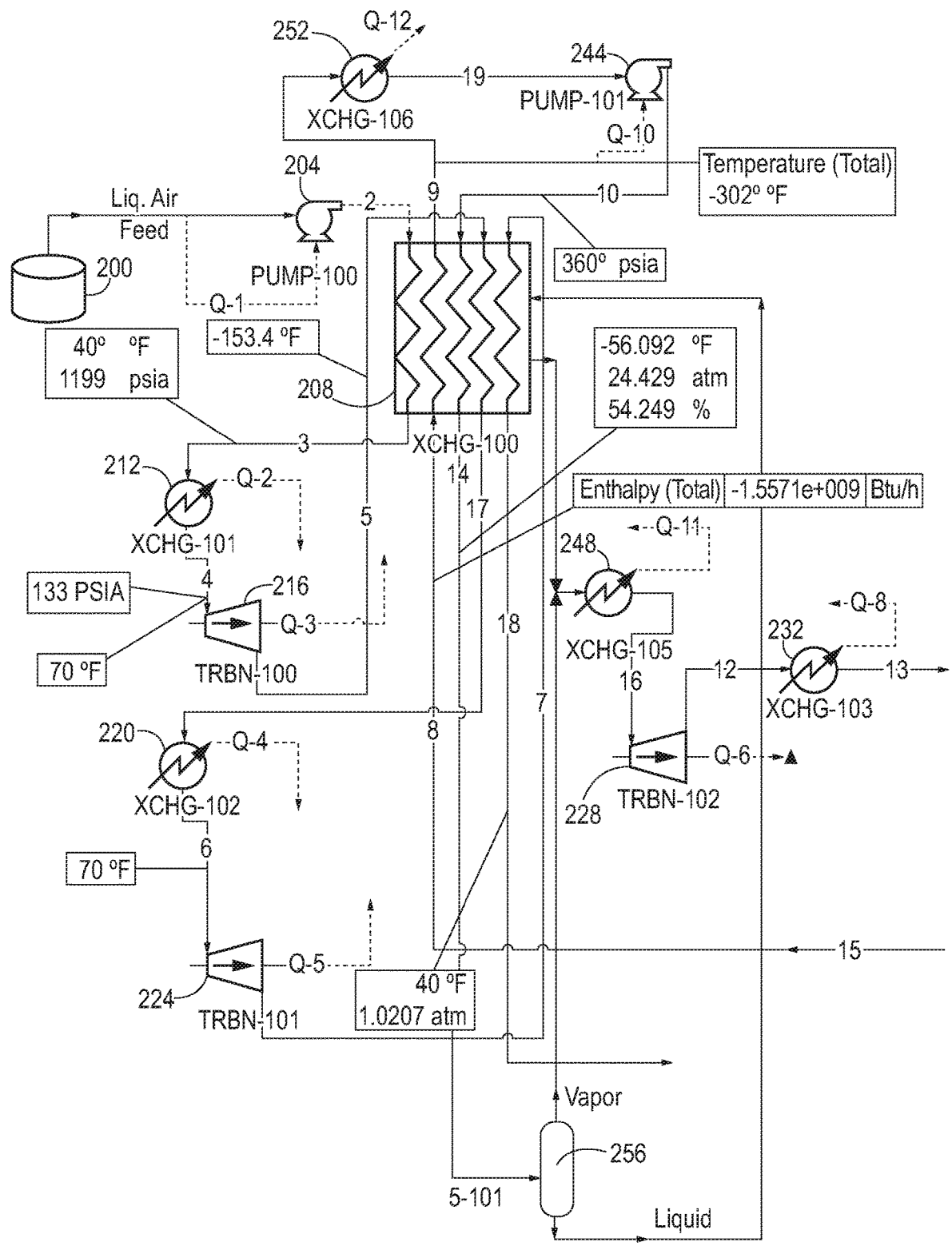
FIG. 2 is a schematic diagram illustrating another embodiment of the disclosed process for LAES.
Figure 3:
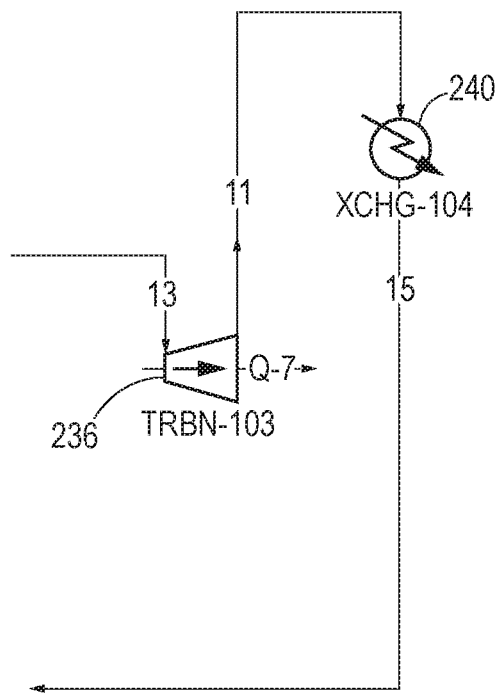
FIG. 3 is a continuation of the schematic diagram of FIG. 2.

FIGS. 2 and 3 show a schematic diagram illustrating another embodiment of the disclosed process for LAES. The differences between this embodiment and the embodiment of FIG. 1 will be discussed below. The refrigerant enters an expander turbine generator 228 at about 70° F. The expander turbine generator 228 generates electricity designated as Q-6. The fluid stream leaves the expander turbine generator 228 at about 0° F. and at about 126 psia and enters a heat exchanger 232. The fluid stream leaves the heat exchanger 232 at about 70° F., and enters a expander turbine generator 236, see FIG. 3. The expander turbine generator 236 generates electricity designated as Q-7. The fluid stream leaves the expander turbine generator 236 at about 7.8° F. and enters a heat exchanger 240. The fluid stream leaves the heat exchanger 240 at about 70° F. and 39 psia and enters the heat exchanger 208, see FIG. 2. The fluid stream leaves the heat exchanger 208 at about −302° F. and enter a heat exchanger 252. The fluid flow leaves the heat exchanger 252 and enters a pump 244. The pump 244 requires energy designated at Q-10. The fluid stream leaves the pump 244 and enters the heat exchanger 208 and exits the heat exchanger 208 and enters a phase separator 256. The vapor portion of the fluid stream leaves the phase separator 256 and enters the heat exchanger 248. The fluid stream leaves the heat exchanger 248 and enters the expander turbine generator 228 at about 70° F. The liquid portion of the fluid stream leaves the phase separator 256 and enters the heat exchanger 208. The liquid portion of the fluid stream is vaporized by the heat exchanger 208, and exits the heat exchanger 208 to enter the heat exchanger 248.

FIG. 4 is a table showing the improvements in power output as compared to the state of the art back in 2012. The total output of power is about 56.14 MW for the embodiment shown in FIG. 1. The total output of power is about 70.02 MW for the embodiment shown in FIGS. 2-3. These power outputs compare favorably with the state of the art in 2012 when the power output was only about 32.58 MW.

The disclosed system and method for liquid air energy storage utilizes a cryogenic liquid air or liquid nitrogen storage system that eliminates the need for underground caverns or spent wells and is ideally suited to wind farms, solar farms and utility-operated power plants. This system is moderate in incremental cost and does not experience air pressure loss during daytime drawdown. It requires installation of an air liquefier, an above-ground liquid air storage tank and an expansion turbine-generator set. The system does not require any fossil fuel input nor does it require external input of heat or industrial gases. It is therefore a stand-alone system. Preliminary economic analysis indicates a return on investment (ROI) of over 40% depending upon the operating parameters (e.g. hours of peak operation; diurnal power cost differentials). Electricity Storage Process Description Zero or low cost nighttime wind power or generated power is utilized to compress, liquefy and store ambient air. The power consumption rating for air liquefaction is used in sizing the storage system in a manner that allows it to consume all of the available nighttime wind power or power plant generation capacity. During daytime peak electricity. demand periods, stored liquid air is vaporized by heat exchange with incoming compressed air that is, in turn liquefied and replaces most of the liquid air consumed in the daytime. Vaporized heated air is expanded to atmospheric pressure in a generator-loaded turbo-expander thus producing large quantities of electricity. The makeup air compressor is powered by electricity produced by the expander-generator. The replacement air compressor's heat of compression is utilized to preheat and reheat the vaporized liquid air prior to the inlet of each expander stage (2-stage expander with reheat). In a typical example, a 20 MW wind farm is operated at night (assume 16 hours) to liquefy air for storage. The air liquefier is sized to replace the spent liquid air stored during the previous night. During peak daytime demand (assume 8 hours), stored liquid air is pumped to the process pressure (at least 500 PSIA) and vaporized by heat exchange with incoming compressed replacement air. The vaporized high pressure air is then heated to approximately to over 300 F by heat exchange with the hot air from each stage of the replacement air compressor. It is then expanded in the first stage of the generator loaded expander. The expander discharge is reheated by hot compressed air and expanded in the 2nd expander stage. The expanded air is then vented to atmosphere at 15 psia. In order to maximize the power output from the generator-loaded expander turbine, the liquid is pumped to over 500 psia before vaporization, warming and heating. This enables the expanded air to perform more work per unit of flow In this example, the net daytime extra power output is approximately 37.5 MW after replacement air compression. At wind farms, this additional daytime power is available on a firm basis and can be sold at a relatively high price because of the ability to deliver it during peak demand periods.

An improved process for renewable storage that utilizes a cryogenic liquid air storage system that eliminates the need for underground caverns or spent wells and is ideally suited to wind farms, solar farms and utility-operated power plants is disclosed herein. This system is moderate in incremental cost and does not experience air pressure loss during daytime drawdown. It requires installation of an air liquefier, an above-ground liquid air storage tank and an expansion turbine-generator set. The system does not require any fossil fuel input nor does it require external input of heat or industrial gases. It is therefore a stand-alone system. The Improved Process for Renewable Electricity Storage addresses the following limitations found in the New Process for Renewable Electricity Storage. 1) The New Process for Renewable Electricity Storage is limited in power output by the expansion turbine pressure ratio. If the expansion pressure ratio exceeds 7:1, the expander discharge air will exit the expander at cryogenic temperatures. The system cannot function properly with these conditions. This limits the power output. 2) In order to solve this problem, the cryogenic expanded air refrigeration must be recovered and utilized in the process. 3) The Improved Process for Renewable Electricity Storage recovers the refrigeration from the expanded air by utilizing a reverse mixed refrigerant cycle (MRC) 4) This improvement allows for higher expansion ratios utilizing higher pressure air (1,200 psia instead of 500 psia) which increases the power output Improved Process for renewable Electricity Storage—Process Description Zero or low cost nighttime wind power or generated power is utilized to compress, liquefy and store ambient air. The power consumption rating for air liquefaction is used in sizing the storage system in a manner that allows it to consume all of the available nighttime wind power or power plant generation capacity. During daytime peak electricity demand periods, stored liquid air is pumped to a pressure of at least 1,200 psia and vaporized by heat exchange with incoming compressed air that is, in turn liquefied and replaces most of the liquid air consumed in the daytime. Vaporized heated air is expanded to atmospheric pressure in a generator-loaded turboexpander thus producing large quantities of electricity. The makeup air compressor is powered by electricity produced by the expander-generator. The expanded air is at cryogenic temperatures after expansion. It is warmed to ambient temperature by heat exchange with a mixed refrigerant. The mixed is thereby liquefied. It is vaporized and warmed to ambient temperature by heat exchange with ambient air or water. The mixed refrigerant vapor is then expanded in two stages thus producing large quantities of additional electric power. The replacement air compressor's heat of compression is utilized to preheat and reheat the vaporized liquid air prior to the inlet of each expander stage (2-stage expander with reheat). In a typical example, a 20 MW wind farm is operated at night (assume 16 hours) to liquefy air for storage. The air liquefier is sized to replace the spent liquid air stored during the previous night. During peak daytime demand (assume 8 hours), stored liquid air is pumped to the process pressure (at least 1,200 PSIA) and vaporized by heat exchange with incoming compressed replacement air. The vaporized high pressure air is then heated to approximately to over 300° F. by heat exchange with the hot air from each stage of the replacement air compressor. It is then expanded in the first stage of the generator-loaded expander. The expander discharge is reheated by hot compressed air and expanded in the 2nd expander stage. The expanded air is then vented to atmosphere at 15 psia. In order to maximize the power output from the generator-loaded expander turbine, the liquid is pumped to over 1,200 psia before vaporization, and warming. This enables the expanded air to perform more work per unit of flow In this example, the net daytime extra power output is approximately 55 MW after replacement air compression. This represents a 70% increase in power output when compared to the Process for Renewable Electricity Storage.

The temperature, pressure, flow rates, and power output can vary depending on factors such as the energy content of the feed gas; the amount of heavy hydrocarbons in the feed; the efficiency of the various components, and the level of insulation of all the pipes and cryogenic components. Of course the above listed values can be adjusted, modified and tuned by system engineers, dependent on various factors, such as but not limited to desired output. The above description does not dwell on the type of heat exchangers used, because those choices are well understood by gas process engineers and are not relevant to the core innovations of the disclosed system. A discussion of the appropriate insulation of hot and cold lines, and the design of valves and sensors are not covered above because those technologies are well understood by process engineers.

This invention includes the use of a mixed refrigerant for refrigeration recovery, The mixed refrigerant will include the following components with concentrations in mole (volume) percentages as follows:

Nitrogen: about 12.0
Ethylene: about 15.0
Methane: about 39.0
Ethane: about 20.0
Propane: about 10.0
Iso-Butane: about 4.0
Total: 100.0

The first two expander-generators will expand dry air which will be discharged at cryogenic temperatures. The cold discharge air will serve to chill the mixed refrigerant stream which will then be expanded in two stages of expander-generators thus producing additional power. In some cases the mixed refrigerant composition will be slightly different for optimization purposes.

The storage of cryogenic liquid (liquid air in one example) may also be liquid oxygen or oxygen rich liquid; liquid nitrogen or nitrogen rich liquid. The stored cryogen may also be liquid methane or LNG or similar hydrocarbon liquid mixture. The secondary refrigeration circuit may be a single mixed refrigerant circuit, or may be two or more staged refrigeration circuits (e.g. a reverse hydrocarbon refrigeration cascade).

The generally parallel nature and close approach of the composite cooling and warming Curves (T versus dH) in the heat exchanger vaporizing the liquid air results in a high thermodynamic efficiency and minimizes "lost work". In a heat transfer process such as the liquid air vaporization exchanger, the thermodynamic relationship for lost work is:

$$W_{lost} = T_0 \text{Integral}(T_1-T_2)/(T_1 \times T_2)dH$$

where $T_0$ is the ambient temperature and $T_1$, and $T_2$ are the temperatures of the hot and cold streams. respectively (all temperatures are absolute temperatures). H represents the enthalpy or heat content of the fluids in the heat exchange process. From this equation it can be understood that the lost work is directly proportional to the temperature difference $(T_1-T_2)$ of the fluids in the heat exchange process. Also lost work is inversely proportional to the square of the absolute temperature level at which the heat transfer occurs.

This invention has many advantages. The disclosed system and method for liquid air energy storage can have an about 75% greater KW output than other systems when using the same liquid air flow rate and pressure. The disclosed system and method for liquid air energy storage unit installed cost (dollars per KW) is less than about 60% of other systems. The disclosed system and method for liquid air energy storage has a unit power out cost ($ per KWH) of about $0.025, wherein other systems may have unit power costs more than $0.04 per KWH. The disclosed may have "black start" capability, whereas other systems do not. The disclosed system and method for liquid air energy storage has a turnaround efficiency of more than about 80%. Other systems would have an RTE of not more than 60%. The disclosed system and method for liquid air energy storage needs only ambient air or water as a heat input source. Other systems require warmer heat sources. Other systems use 30° C. (86° F.) heat input source, which is not usually available. The disclosed system and method for liquid air energy storage is totally standalone during power output periods and needs no external heat, refrigeration or gas inputs.

It should be noted that the terms "first", "second", and "third", and the like may be used herein to modify elements performing similar and/or analogous functions. These modifiers do not imply a spatial, sequential, or hierarchical order to the modified elements unless specifically stated. While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A liquid air energy storage system, the system comprising:
   a liquid air storage means;
   an input of a first pump in fluid communication with the liquid air storage means;
   a first heat exchanger in fluid communication with an output of the first pump;
   a second heat exchanger in fluid communication first heat exchanger and configured to receive the fluid stream from the first pump and the first heat exchanger;
   a first expander turbine generator in fluid communication with the second heat exchanger;
   the first heat exchanger in fluid communication with the first expander turbine generator;
   a third heat exchanger in fluid communication with the first heat exchanger and configured to receive the fluid stream from the first expander turbine generator and the first heat exchanger;
   a second expander turbine generator in fluid communication with the third heat exchanger;
   the first heat exchanger in fluid communication with the second expander turbine generator;
   the fluid stream from second expander turbine generator and first heat exchanger in fluid communication with ambient atmosphere;
   a mixed refrigerant stream in fluid communication with a third expander turbine generator;
   a fourth heat exchanger in fluid communication with the third expander turbine generator;
   a fourth expander turbine generator in fluid communication with the fourth heat exchanger;
   a fifth heat exchanger in fluid communication with the fourth expander turbine generator;
   the first heat exchanger in fluid communication with the fifth heat exchanger;
   an input of a second pump in fluid communication with the first heat exchanger, and configured to receive the mixed refrigerant stream from the fifth heat exchanger and the and the first heat exchanger;
   the first heat exchanger in fluid communication with the output of the second pump;
   a sixth heat exchanger in fluid communication with the first heat exchanger, and configured to receive the mixed refrigerant stream from the output of the second pump and the first heat exchanger; and
   the third expander turbine generator in fluid communication with the sixth heat exchanger.

2. The liquid energy storage system of claim 1, wherein the mixed refrigerant will include the following components with concentrations in mole volume percentages as follows: about 12.0% Nitrogen, about 15.0% Ethylene, about 39.0% Methane, about 20.0% Ethane, about 10.0% Propane, and about 4.0% Iso-Butane.

3. The liquid energy storage system of claim 1, where thermodynamic relationship for lost work is characterized by:

$$W_{lost} = T_O \text{Integral}(T_1-T_2)/(T_1 \times T_2)dH,$$

where $T_o$ is the ambient temperature and $T_1$, and $T_2$ are the temperatures of the hot and cold streams, respectively, tall temperatures are absolute temperatures), and H represents the enthalpy or heat content of the fluids in the heat exchange process.

4. A liquid air energy storage system, the system comprising:
   a liquid air storage means;
   an input of a first pump in fluid communication with the liquid air storage means;
   a first heat exchanger in fluid communication with an output of the first pump;

a second heat exchanger in fluid communication first heat exchanger and configured to receive the fluid stream from the first pump and the first heat exchanger;
a first expander turbine generator in fluid communication with the second heat exchanger;
the first heat exchanger in fluid communication with the first expander turbine generator;
a third heat exchanger in fluid communication with the first heat exchanger and configured to receive the fluid stream from the first expander turbine generator and the first heat exchanger;
a second expander turbine generator in fluid communication with the third heat exchanger;
the first heat exchanger in fluid communication with the second expander turbine generator;
the fluid stream from second expander turbine generator and first heat exchanger in fluid communication with ambient atmosphere;
a mixed refrigerant stream in fluid communication with a third expander turbine generator;
a fourth heat exchanger in fluid communication with the third expander turbine generator;
a fourth expander turbine generator in fluid communication with the fourth heat exchanger;
a fifth heat exchanger in fluid communication with the fourth expander turbine generator;
the first heat exchanger in fluid communication with the fifth heat exchanger;
a seventh heat exchanger in fluid communication with the first heat exchanger, and configured to receive the mixed refrigerant stream from the fifth heat exchanger and the and the first heat exchanger;
an input of a second pump in fluid communication with the seventh heat exchanger;
the first heat exchanger in fluid communication with the output of the second pump;
a phase separator in fluid communication with the first heat exchanger, and configured to receive the mixed refrigerant stream from the output of the second pump and the first heat exchanger;
a liquid mixed refrigerant stream exiting the phase separator and in fluid communication with the first heat exchanger;
the liquid mixed refrigerant vaporizing due to the first heat exchanger and becoming a second vapor mixed refrigerant stream;
a sixth heat exchanger in fluid communication second vapor mixed refrigerant stream;
the third expander turbine generator in fluid communication with the sixth heat exchanger; and
a first vapor mixed refrigerant stream exiting the phase separator and in fluid communication with the sixth heat exchanger.

5. The liquid energy storage system of claim 4, wherein the mixed refrigerant will include the following components with concentrations in mole volume percentages as follows: about 12.0% Nitrogen, about 15.0% Ethylene, about 39.0% Methane, about 20.0% Ethane, about 10.0% Propane, and about 4.0% Iso-Butane.

6. The liquid energy storage system of claim 4, where thermodynamic relationship for lost work is characterized by:

$$W_{lost}=T_O \text{Integral}(T_1-T_2)/(T_1 \times T_2)dH,$$

where $T_o$ is the ambient temperature and $T_1$, and $T_2$ are the temperatures of the hot and cold streams, respectively, all temperatures are absolute temperatures, and H represents the enthalpy or heat content of the fluids in the heat exchange process.

7. A method for liquid air energy storage, the method comprising:
pumping a liquid air stream in a first pump;
exchanging heat with the liquid air stream in a first heat exchanger so the liquid air becomes vapor air stream;
removing energy from the vapor air stream in a second heat exchanger;
driving a first expander turbine generator with the vapor air stream and generating a first amount of electricity;
cooling the vapor air stream from the first expander turbine generator in the first heat exchanger;
removing energy from the vapor air stream from the first heat exchanger and from the first expander turbine generator in a third heat exchanger;
driving a second expander turbine generator with the vapor air stream and generating a second amount of electricity;
exchanging heat with the vapor air stream from the second expander turbine generator in the first heat exchanger and then releasing the vapor air stream to the ambient atmosphere;
driving a third expander turbine generator with a mixed refrigerant vapor stream and generating a third amount of electricity;
removing energy from the mixed refrigerant vapor stream in a fourth heat exchanger;
driving a fourth expander turbine generator with the mixed refrigerant vapor stream from the fourth heat exchanger and generating a fourth amount of electricity;
removing energy from the mixed refrigerant vapor stream in a fifth heat exchanger;
exchanging energy with the mixed refrigerant vapor stream in the first heat exchanger;
pumping the mixed refrigerant vapor stream in a second pump;
exchanging energy with the mixed refrigerant vapor stream from the second pump in the first heat exchanger, and
exchanging energy with the mixed refrigerant vapor stream from the first heat exchanger and second pump in a sixth heat exchanger.

8. The method for liquid energy storage of claim 7, wherein the mixed refrigerant will include the following components with concentrations in mole volume percentages as follows: about 12.0% Nitrogen, about 15.0% Ethylene, about 39.0% Methane, about 20.0% Ethane, about 10.0% Propane, and about 4.0% Iso-Butane.

9. The method for liquid energy storage of claim 7, where thermodynamic relationship for lost work is characterized by:

$$W_{lost}=T_O \text{Integral}(T_1-T_2)/(T_1 \times T_2)dH,$$

where $T_o$ is the ambient temperature and $T_1$, and $T_2$ are the temperatures of the hot and cold streams, respectively, all temperatures are absolute temperatures, and H represents the enthalpy or heat content of the fluids in the heat exchange process.

10. A liquid air energy storage system, the system comprising:
pumping a liquid air stream in a first pump;
exchanging heat with the liquid air stream in a first heat exchanger so the liquid air becomes vapor air stream;

removing energy from the vapor air stream in a second heat exchanger;

driving a first expander turbine generator with the vapor air stream and generating a first amount of electricity;

cooling the vapor air stream from the first expander turbine generator in the first heat exchanger;

removing energy from the vapor air stream from the first heat exchanger and from the first expander turbine generator in a third heat exchanger;

driving a second expander turbine generator with the vapor air stream and generating a second amount of electricity;

exchanging heat with the vapor air stream from the second expander turbine generator in the first heat exchanger and then releasing the vapor air stream to the ambient atmosphere;

driving a third expander turbine generator with a mixed refrigerant vapor stream and generating a third amount of electricity;

removing energy from the mixed refrigerant vapor stream in a fourth heat exchanger;

driving a fourth expander turbine generator with the mixed refrigerant vapor stream from the fourth heat exchanger and generating a fourth amount of electricity;

removing energy from the mixed refrigerant vapor stream in a fifth heat exchanger;

exchanging energy with the mixed refrigerant vapor stream in the first heat exchanger;

exchanging energy with the mixed refrigerant vapor stream in a seventh heat exchanger;

pumping the mixed refrigerant vapor stream in a second pump;

exchanging energy with the mixed refrigerant vapor stream from the second pump in the first heat exchanger and creating a mixed refrigerant liquid vapor stream;

separating a mixed refrigerant vapor stream and mixed refrigerant liquid stream from the mixed refrigerant liquid vapor stream in a phase separator;

exchanging energy with the mixed refrigerant liquid stream from the phase separator in the first heat exchanger, changing the mixed refrigerant liquid stream to a mixed refrigerant vapor stream;

exchanging energy with the mixed refrigerant vapor stream from the first heat exchanger and phase separator in a sixth heat exchanger; and exchanging energy with the mixed refrigerant vapor stream directly from the phase separator in the sixth heat exchanger.

11. The liquid energy storage system of claim 10, wherein the mixed refrigerant will include the following components with concentrations in mole volume percentages as follows: about 12.0% Nitrogen, about 15.0% Ethylene, about 39.0% Methane, about 20.0% Ethane, about 10.0% Propane, and about 4.0% Iso-Butane.

12. The liquid energy storage system of claim 10, where thermodynamic relationship for lost work is characterized by:

$$W_{lost} = T_O \text{Integral}(T_1 - T_2)/(T_1 \times T_2) dH,$$

where $T_o$ is the ambient temperature and $T_1$, and $T_2$ are the temperatures of the hot and cold streams, respectively, all temperatures are absolute temperatures, and H represents the enthalpy or heat content of the fluids in the heat exchange process.

* * * * *